Aug. 12, 1969   R. W. McKIRDY ET AL   3,460,526
APPARATUS FOR FLOW-CONTROL AND PRESSURE MEASUREMENT
Filed Aug. 23, 1965
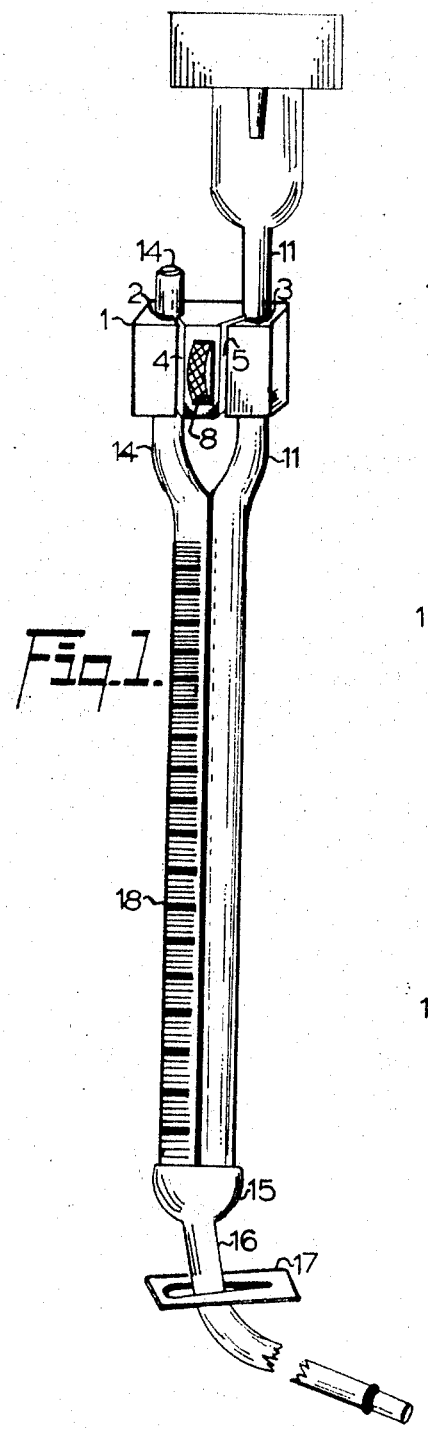
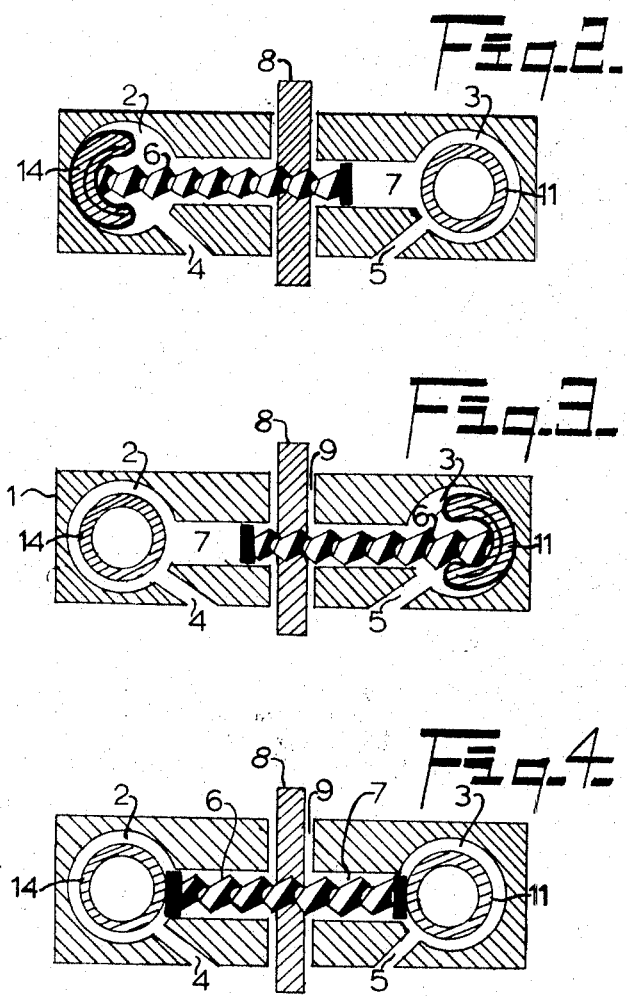
INVENTORS.
Robert W. McKirdy
Harvey J. Engelsher

United States Patent Office 3,460,526
Patented Aug. 12, 1969

3,460,526
APPARATUS FOR FLOW-CONTROL AND
PRESSURE MEASUREMENT
Robert W. McKirdy, Scarsdale, and Harvey J. Engelsher,
Yonkers, N.Y., assignors, by mesne assignments, to
Horizon Industries, Ltd., a corporation of New York
Filed Aug. 23, 1965, Ser. No. 481,469
Int. Cl. A61b 5/02
U.S. Cl. 128—2.05                                    4 Claims

ABSTRACT OF THE DISCLOSURE

A combined fluid infuser and monometer for controlling the flow of fluids and monitoring the pressure variations therein. The system includes a pair of tubes interconnected to form a monometer and having infuser conduit means connected to and in communication with the monometer. The system further includes reservoir means connected to and in communication with the monometer, and fluid control means for selectively controlling the flow of fluid through the system. Calibrated scale means are further provided, in association with the monometer, for measuring the pressure of the fluid in the infuser conduit means.

---

This invention relates, generally, to an infusion apparatus, and more specifically, to a combined fluid infuser and monometer for monitoring the pressure variations therein.

It is an object of the present invention to provide a venous infusion system adapted to selectively allow measurement of venous blood pressure and control venous infusion.

A further object and feature of the present invention is to provide an accurate apparatus for observation of constant or fluctuating fluid pressures.

Another object, feature and advantage of the present invention is to provide an improved infusion apparatus which is easily and economically manufactured and is highly efficient in use.

The above and other objects, features and advantages of the present invention will become more apparent from a consideration of the following description when taken in conjunction with the accompanying drawings.

In the drawings illustrating this invention:

FIG. 1 shows an apparatus for infusing fluid intravenously and for measuring the internal pressure of the system being infused.

FIG. 2 shows the valve with measuring tube closed and the supply tube open.

FIG. 3 shows the valve with supply tube closed and the measuring tube open.

FIG. 4 shows the valve with both tubes open.

For example, in current practice, the central venous pressure of a patient receiving fluid by venipuncture is ascertained after stopping the flow of fluid from the supply bottle and allowing the internal venous pressure to raise a fluid column in an external measuring tube which is connected with the intravenous needle through a common tube from the external supply line. After the venous pressure has been measured the flow from the infusion bottle is restored by the hydrostatic pressure of the fluid contained in the supply-bottle. With the device of this invention either the supply tube or the measuring tube can be closed as required, while the other is opened, and the loss of time which now occurs in manipulating a conventional 3-position barrel-valve or a number of individually mounted tube controls is avoided.

Having thus described the purpose and advantages of this invention, we now describe the device as illustrated in the drawings.

In FIG. 1 of the drawings the body 1 is provided with two cylindrical passages 2 and 3 into each of which collapsible plastic tubes 14 and 11 respectively are inserted through slots 4 and 5. A pressure bar 6 left handedly threaded and having two parallel faces moves towards or away from either collapsible tube along slot 7. By rotating a knurled disk 8 which is threaded through its center to receive the pressure-bar 6 and to which it is right angularly set in slot 9, collapsible tube 14 in cylindrical passage 2 may be compressed and its lumen closed while a similar tube 11 in cylindrical passage 3 relaxes as pressure is removed thereby allowing the opening of its lumen. Threaded pressure bar 6 may be adjusted to a point at which tubes 11 and 14 are in communication with each other and with common tube 16 through their junction 15 thereby allowing equilibration of fluid levels on either side of the junction. Flow rate through common tube 16 may be controlled by adjustment of shut-off valve 17. Scale 18 indicates the venous pressure in units mm. water.

FIG. 2 shows a collapsible tube 14 in cylindrical passage 2 closed while similar tube 11 in cylindrical passage 3 is open.

FIG. 3 shows condition of tubes 11 and 14 and pressure bar 6 reciprocal of that shown in FIG. 2.

FIG. 4 shows the pressure bar 6 after having been adjusted, by rotating knurled disk 8, to a position midway between cylindrical passages 2 and 3.

During transfusion of a patient intravenously supply tube 11 and common tube 16 are open the latter being adjusted to the desired flow-rate by means of shut-off valve 17. When a reading of the patient's central venous pressure is required tube 16 is closed while tube 14 is opened to permit equilibration of fluid levels in tubes 11 and 14. Measuring tube 14 and common tube 16 are then fully opened, supply tube 11 is closed and the rise or fall of central venous pressure of the patient is indicated on scale 18. While a typical embodiment of the invention has been illustrated, it should be understood that the wider scope of this invention is embraced within one or more of the claims following.

What is claimed is:

1. A combined fluid infuser and manometer comprising:
 (a) first and second laterally related tubes;
 (b) infusion fluid reservoir means connected to one end of the first tube;
 (c) single conduit means connected at one end thereof to the other end of the first tube and to one end of the second tube;
 (d) the second tube having a terminal end open to the atmosphere and further including a flexible portion adjacent the terminal end thereof;
 (e) the first tube having a flexible portion located adjacent the flexible portion of the second tube;
 (f) fluid control means engaging the flexible portions of the first and second tubes;
 (g) said control means comprising a movable elongated clamping member with the opposite end portions thereof in opposed relation to the respective flexible portions of the first and second tubes;
 (h) means for moving the movable member to positions for clamping a selected one of the flexible portions of the first and second tubes, and to a position permitting fluid flow through said tubes; and
 (i) means for clamping the single conduit means;
whereby the movable member, in one position thereof, is operative to clamp the flexible portion of the second tube while permitting fluid to flow from the reservoir means through the first tube and through the single conduit means when the clamping means thereof is inoperative for an infusion operation; and in a second position thereof, is operative to establish communication between the first and second tubes when the clamping means of the single conduit means is operative for equalizing the levels of fluid in said tubes; and in a third position thereof, is operative to clamp the flexible portion of the first tube while permitting communication between the second tube and the single conduit means when the clamping means thereof is inoperative to thereby establish a level of fluid in the second tube responsive to a given pressure of fluid in the single conduit means.

2. The combined fluid infuser and manometer as recited in claim 1, wherein said fluid control means includes a casing having through openings for passing the flexible portions of the first and second tubes; said casing further including a passageway interconnecting the through openings and for receiving the movable member therein; said casing further including a slot intersecting the passageway for receiving the means for moving the movable member.

3. The combined fluid infuser and manometer as recited in claim 1, wherein said movable member and said means for moving the movable member have threaded interengaging portions.

4. The combined fluid infuser and manometer as recited in claim 1, further comprising calibrated scale means on the second tube for measuring the pressure of the fluid in the single conduit means.

References Cited

UNITED STATES PATENTS

| | | | |
|---|---|---|---|
| 3,124,133 | 3/1964 | Marbach | 128—214 |
| 3,167,085 | 1/1965 | Redmer | 251—8 X |

OTHER REFERENCES

Surgery, vol. 56, No. 3, September 1964, p. 26 (advert.).

DALTON L. TRULUCK, Primary Examiner

U.S. Cl. X.R.

128—214